United States Patent
Ferchland et al.

(10) Patent No.: US 9,015,220 B2
(45) Date of Patent: Apr. 21, 2015

(54) CORRELATION DEVICE

(75) Inventors: Tilo Ferchland, Dresden (DE); Frank Poegel, Dresden (DE); Eric Sachse, Leipzig (DE)

(73) Assignee: Atmel Corporation, San Jose, CA (US)

( * ) Notice: Subject to any disclaimer, the term of this patent is extended or adjusted under 35 U.S.C. 154(b) by 352 days.

(21) Appl. No.: 13/551,144

(22) Filed: Jul. 17, 2012

(65) Prior Publication Data

US 2013/0013660 A1 Jan. 10, 2013

Related U.S. Application Data

(63) Continuation of application No. 12/120,719, filed on May 15, 2008, now Pat. No. 8,239,437.

(60) Provisional application No. 60/939,849, filed on May 23, 2007.

(30) Foreign Application Priority Data

May 15, 2007 (DE) .......................... 10 2007 022 978

(51) Int. Cl.
  *G06F 17/15* (2006.01)
  *H04B 1/707* (2011.01)
  *H04L 7/04* (2006.01)
  *H04L 7/08* (2006.01)

(52) U.S. Cl.
  CPC ............... *H04B 1/707* (2013.01); *G06F 17/15* (2013.01); *H04L 7/042* (2013.01); *H04B 2201/70707* (2013.01); *H04L 7/043* (2013.01); *H04L 7/08* (2013.01)

(58) Field of Classification Search
  None
  See application file for complete search history.

(56) References Cited

U.S. PATENT DOCUMENTS

| | | | |
|---|---|---|---|
| 4,161,033 A | | 7/1979 | Martinson |
| 4,694,414 A | * | 9/1987 | Christopher .................. 708/313 |
| 5,014,118 A | * | 5/1991 | Shirai ............................ 348/613 |
| 5,119,195 A | * | 6/1992 | Christopher .................. 348/623 |
| 5,142,488 A | | 8/1992 | Chan et al. |
| 5,440,583 A | | 8/1995 | Kolke |
| 5,488,576 A | * | 1/1996 | Main ............................. 708/300 |
| 5,535,149 A | * | 7/1996 | Mori et al. ..................... 708/322 |
| 5,661,753 A | | 8/1997 | Iamura |
| 6,445,735 B1 | * | 9/2002 | Whikehart .................... 375/232 |
| 6,684,233 B1 | | 1/2004 | Kolke |
| 7,774,394 B2 | * | 8/2010 | Menkhoff ..................... 708/313 |
| 2005/0207506 A1 | | 9/2005 | Iwami |
| 2005/0283508 A1 | * | 12/2005 | Hennedy ....................... 708/300 |
| 2013/0013660 A1 | * | 1/2013 | Ferchland et al. ............ 708/425 |

OTHER PUBLICATIONS

Chinese Office Action and English Translation of Text of the First Office Action, Chinese Patent Application No. 200880009607.9, filed May 15, 2007; Ref. USBBL68699-gy, 2012033100244530 (4 pgs), Apr. 6, 2012.

* cited by examiner

*Primary Examiner* — David H Malzahn
(74) *Attorney, Agent, or Firm* — Fish & Richardson P.C.

(57) ABSTRACT

In certain embodiments, a device includes a first filter. The first filter is operable to produce at least one correlation result by at least correlating an input signal sequence with a link sequence. The first filter includes a delay element. The device also includes a second filter sharing the delay element of the first filter.

13 Claims, 4 Drawing Sheets

CORRELATION DEVICE

RELATED APPLICATIONS

This nonprovisional application is a continuation of U.S. application Ser. No. 12/120,719, filed May 15, 2008 (now U.S. Pat. No. 8,239,437 issued on Aug. 7, 2012), and entitled "Correlation Device," and claims priority to German Patent Application No. DE 102007022978.1, filed in Germany on May 15, 2007, and to U.S. Provisional Application No. 60/939,849, filed May 23, 2007.

BACKGROUND OF THE INVENTION

1. Field of the Invention

The present invention relates to the field of digital signal processing.

2. Description of the Background Art

So-called "Wireless Personal Area Networks" (WPANs) can be used for the wireless transmission of information over relatively short distances (between 1 cm, 10 m, and 120 m). In contrast to "Wireless Local Area Networks" (WLANs), WPANs require little or even no infrastructure for data transmission, so that small, simple, energy-efficient, and cost-effective devices can be implemented for a broad range of applications.

Standard IEEE 802.15.4 specifies, for example, low-rate WPANs, which are suitable with raw data rates up to a maximum of 250 kbit/s and stationary or mobile devices for applications in industrial monitoring and control, in sensor networks, in automation, and in the field of computer peripherals and for interactive games. In addition to a very simple and cost-effective implementability of devices, an extremely low power demand of devices is of critical importance for such applications. Thus, an objective of this standard is a battery life of several months to several years.

At the level of the physical layer, in the virtually globally available 2.4 GHz ISM band (industrial, scientific, medical) for raw data rates of fB=250 kbit/s, the IEEE standard 802.15.4 specifies a band spread (spreading) with a chip rate of fC=2 Mchip/s and an offset QPSK modulation (quaternary phase shift keying) at a symbol rate of fS=62.5 ksymbol/s.

In an 802.15.4 transmitter for the ISM band, the data stream to be transmitted is first converted to a sequence of PN sequences (pseudo noise) with the use of four databits in each symbol period (TS=1/fS=16 µs), in order to select a total of 16 PN sequences. Each symbol of four databits is assigned in this manner a symbol value-specific PN sequence of 32 PN chips (chip period TC=TS/32=500 ns=1 fC), which is transmitted instead of the four databits. The "quasi-orthogonal" PN sequences P0, P1, . . . , P15, specified in the standard, differ from one another in cyclic shifts and/or inversion of each second chip value (see IEEE Standard 802.15.4-2003, Chapter 6.5.2.3).

The PN sequences assigned to the successive symbols are joined together and then offset QPSK modulated (quaternary phase shift keying) by modulating, with half-sine pulse shaping, the even-indexed PN chips (0, 2, 4, . . . ) onto the in-phase (I) carrier and the odd-indexed PN chips (1, 3, 5, . . . ) onto the quadrature-phase (Q) carrier. To form an offset, the quadrature-phase chips are delayed by half a chip period TC with respect to the in-phase chips (see IEEE Std 802.15.4-2003, Chapter 6.5.2.4).

Both coherent and incoherent approaches are known to detect data symbols present in a receive signal. Whereas in coherent approaches the receive signal is converted into the complex envelope (baseband) with use of a carrier wave of the same frequency and phase and obtained from the carrier control circuit, in incoherent approaches at least the phase accuracy, within limits possibly also the frequency accuracy of the carrier wave, can be omitted.

A coherent receiving unit is known from the textbook "Nachrichtenübertragung" [Message Transmission] by Karl-Dirk Kammeyer, $2^{nd}$ edition, B. G. Teubner, Stuttgart, ISBN 3-519-16142-7 (FIG. 12.1.7 on page 417). A disadvantage in this case is the high realization cost, which arises, on the one hand, from the necessary carrier control circuit with the associated high-rate (higher than the chip rate) multiplication of the receive signal with the frequency- and phase-accurate carrier wave and, on the other, from the costly and complex signal processing with a high-rate complex matched filtering. This high realization cost in addition causes a very high power consumption.

An incoherent receiving unit is known furthermore from the aforementioned textbook (FIG. 12.3.7 on page 447). It has an FM discriminator, an integration unit, and a so-called limiter and requires the processing of high-rate (higher than the chip rate) and sometimes complex-valued signals. This is associated in turn with a high realization cost and a high power consumption. In addition, the efficiency (symbol error rate, etc.) of this receiving unit during demodulation of MSK signals is not adequate.

For the detection of data symbols contained in a receive signal or for the detection of data symbol boundaries, the transmit symbols to be transmitted are typically transmitted within transmission frames, whereby a sequence, e.g., a PN sequence, known receive-side, is appended in the form of a preamble to each transmission frame. Frame detection, during which the symbol boundaries are determined, is performed first in the receiver based on the preamble. A conventional receive signal is shown in FIG. 3. It comprises, for example, transmit symbols 301 and 303 each with L sampling values (coefficients) and a preamble 305, which contains, e.g., the coefficients 010110, already known receive-side, and repeats.

For receive-side frame synchronization, the receive signal is first supplied to cross-correlation filter 401 (KKF), which is shown in FIG. 4 and performs a cross correlation between the receive signal and the preamble word or preamble symbol (preamble). The output signal of cross-correlation filter 401 has periodic peaks, which in each case indicate a correlation maximum. A correlation maximum arises during complete or almost complete overlapping of the preamble in the receive signal and the preamble used receive-side for cross correlation. For this reason, a conclusion can be reached about the particular frame or symbol boundary based on the correlation maxima, which can be detected, for example, by means of a threshold value detector.

Based on the channel properties, such as, for example, multipath propagation or channel noise, the correlation maxima at the output of cross-correlation filter 401, however, are relatively weakly pronounced. In order to express the correlation maxima more strongly, a comb filter 403, which is, for example, an IIR filter with a low-pass characteristic (IIR: Infinite Impulse Response), can be connected downstream of cross-correlation filter 401. An improved correlation signal forms at the output of filter 403; as shown in FIG. 4, it has clearly pronounced correlation maxima and reduced correlation minima in comparison with the correlation signal at the output of cross-correlation filter 401. The time position of the correlation maxima remains unchanged here.

FIG. 5 shows a block diagram of the correlation device of FIG. 4 with a correlation filter 501, which is an FIR filter (FIR: Finite Impulse Response), and an IIR filter, which is connected downstream to the FIR filter 501 and which has an adder 503 and a delay element 505 disposed in a feedback loop and producing a delay by an L clock. Further, amplifying elements 507 and 509 are provided, which also belong to the IIR filter, to amplify the signals applied at the inputs of adder 503. The output signal of the adder provides a sequence on whose basis the frame detection can be performed.

The structure of correlation filter 501 of FIG. 5 is shown in greater detail in FIG. 6. The correlation filter comprises a shift register 601 for delaying the input signal sequence by an L clock, whereby shift register 601 further has a number of outputs to provide the content of the register cells coefficient-wise via the number of register outputs. Multipliers 603 are connected downstream to the register outputs and perform a coefficient-wise multiplication of the register coefficients with already known, receive-side preamble coefficients. The multiplication results are summed up by means of an addition element 605, whereby the summation result is supplied to adder 503 via amplifier 507. As a result, a convolution with a temporally twisted correlation sequence is performed.

A disadvantage of the correlation device shown in FIG. 6 is its high complexity and the associated increased power requirement, because two delay elements, 505 and 601, are needed for its realization.

SUMMARY OF THE INVENTION

It is therefore an object of the invention to provide a correlation device with a lower power requirement.

The present invention is based on the realization that the complexity and thereby the power requirement of the correlation device can be reduced by a permutation of the signal processing sequence. Due to this permutation, a delay element can be omitted, so that a single delay element can be provided both for the correlation and for the IIR filtering.

According to the invention, an input signal sequence, which represents, for example, a receive signal and has sampling coefficients, is supplied directly or amplified to an adder, whose output is coupled to an input of the single delay element. The delay element, for example, a shift register or a ring buffer, delays the output signal sequence of the adder and supplies the resulting delayed signal sequence (as an auxiliary signal sequence) to another input of the adder. The delay element comprises further a plurality of outputs at which the respective contents of the register cells can be output, which are determined by the adder output signal sequence coefficients taken up by the delay element. These coefficients are correlated, for example, in parallel with coefficients of a link sequence, which, for example, represents the preamble or is based on the preamble. The resulting correlation results already contain information about the correlation coefficients, which can be obtained by summing up the correlation results. Based on the correlation results or the continuously obtained correlation coefficients, the correlation maxima can be determined and then used for frame detection or for detecting symbol boundaries.

Apart from the reduction of the power requirement, according to the invention, simplification of the structure, which enables efficient hardware or software realization of the correlation device, is also achieved by economizing on a delay element.

The invention provides a correlation device with an adder for adding an input signal sequence and an auxiliary signal sequence to obtain an addition signal sequence, and with a delay element for delaying the addition signal sequence to obtain the auxiliary signal sequence, whereby the delay element has a plurality of coefficient outputs for providing the addition signal sequence coefficients. The correlation device comprises further a linking element for the coefficient-wise linking of the coefficients of the addition signal sequence with linking coefficients to obtain one or more correlation result.

According to an embodiment, the correlation results can already form an output signal of the correlation device, on whose basis, for example, further processing, such as, e.g., the detection of the correlation maxima, can be performed.

According to another embodiment, the correlation device comprises an addition unit for summing up the correlation results, to obtain a correlation coefficient. In this case, the correlation coefficient or a sequence of successive correlation coefficients is the output signal of the correlation device.

According to another embodiment, the delay element comprises a number of memory elements, each with a coefficient output. The number of memory elements can therefore take up the number of the addition signal sequence coefficients or provide this via the number of coefficient outputs. The delay element can be, for example, a shift register or a ring buffer, which is expanded by the number of coefficient outputs compared with a conventional ring buffer, to provide the addition signal sequence coefficients.

According to another embodiment, the adder comprises a first adder input for receiving the input signal sequence, a second adder input for receiving the auxiliary signal sequence, and an adder output for outputting the addition signal sequence, whereby the delay element is connected downstream to the adder output and has an output that is coupled to the second adder input. The delay element further has a plurality of outputs for providing the addition signal sequence coefficients, whereby the linking element is connected downstream of the plurality of delay element outputs and has a plurality of outputs for providing correlation results. The linking element is preferably formed to link the addition signal sequence coefficients that can be provided at the delay element outputs coefficient-wise with linking coefficients to provide the correlation results. An efficient realization of the correlation device is achieved in the hardware by means of this structure.

According to another embodiment, the type of linking coefficients is taken into account during the linking of the addition signal sequence coefficients with the linking coefficients for the purpose of forming the correlation results. If the amplitudes thereof are, for example, the same or different from the linking coefficients in signs or predefined amplitudes, the linking can be realized by a predefined scaling (e.g., by the factor of 2) or by means of a sign inversion. For this reason, the linking element can be formed to scale a coefficient of the addition signal sequence using a scaling factor to obtain a correlation result, whereby the scaling factor is determined by an amplitude and/or by a sign of a linking coefficient. This enables efficient linking. This also applies to other coefficients.

According to another embodiment, the linking element is formed to output an addition signal sequence coefficient unchanged or with an inverted sign as a correlation result, if a sign of a linking coefficient is positive or negative. This also applies to other coefficients.

According to another embodiment, the adder and the delay element, which again supplies the auxiliary sequence to the adder, form a comb filter.

According to another embodiment, the link sequence is derived by differential modulation or demodulation of a preamble usable receive-side.

According to another aspect, the invention provides a detection device for detecting a preamble in an input signal sequence with use of the link sequence, which has the preamble or a preamble sequence dependent on the preamble, with a correlation device of the invention, and a detector for detecting the preamble based on an output signal of the correlation device. The detector can be formed, for example, to determine the correlation maxima by means of threshold value detection or by peak detection.

According to another aspect, the invention provides a correlation method with the following steps: adding an input signal sequence and an auxiliary signal sequence to obtain an addition signal sequence, delaying the addition signal sequence to obtain the auxiliary signal sequence, providing addition sequence coefficients, and coefficient-wise linking of the addition signal sequence coefficients with linking coefficients to obtain correlation results.

Other embodiments of the correlation method are determined by the functionality of the correlation device of the invention.

According to another aspect, the invention provides a method for detecting a preamble in an input signal sequence with use of a link sequence, which has the preamble or a preamble sequence dependent on the preamble. The method for detecting the preamble comprises the steps of the correlation method according to the invention and the step of detecting the preamble based on an output signal of the correlation device.

According to another aspect, the method provides a computer program for performing at least one of the methods according to the invention, when the computer program runs on a computer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
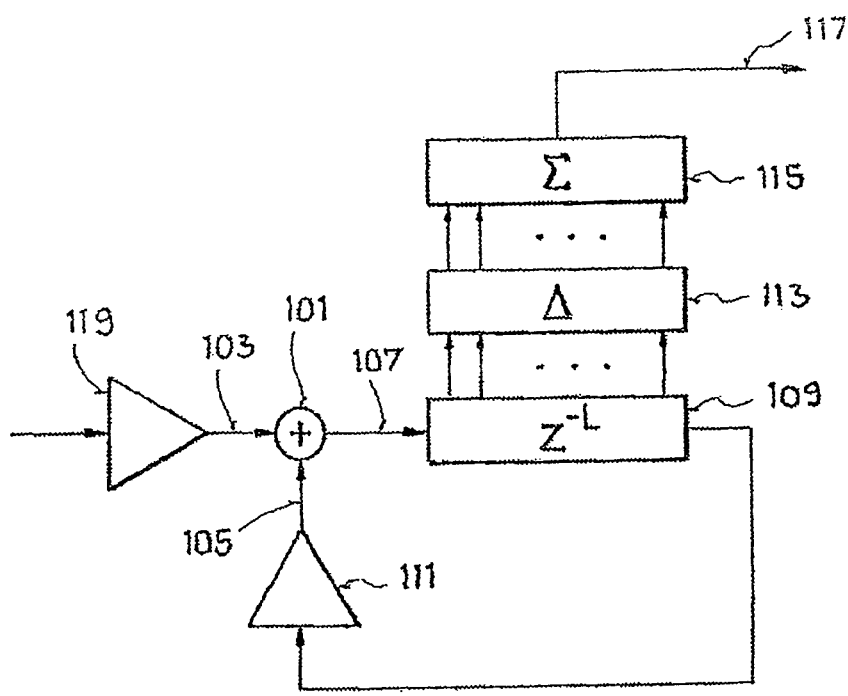
FIG. 1 shows a block diagram of a correlation device according to an embodiment.

The correlation device shown in FIG. 1 comprises an adder 101 with a first input 103, a second input 105, and an output 107, which is connected to an input of a delay element 109. Delay element 109 comprises an output, which is coupled to the second input 105 of adder 101 via an optional amplifier 111.

Delay element 109 comprises further, for example, L outputs, whereby L is a natural number, which is connected in each case to corresponding L inputs of a linking element 113 ($\Delta$). Linking element 113 comprises L outputs, which are coupled to L inputs of an addition element 115 ($\Sigma$), which comprises an output 117. Furthermore, an optional amplifier 119 is provided.

An input signal sequence is supplied to adder 101 after optional amplification by amplifier 119. Adder 101 adds an auxiliary signal sequence that can be applied at second input 105 and the input signal sequence to apply an addition signal sequence via output 107 at the input of delay element 109, which delays the addition signal sequence by, for example, L clocks (based on the sampling rate underlying the addition signal sequence or on the clock rate with which delay element 109 is clocked). For this purpose, delay element 109 comprises, for example, L memory cells, each memory cell being assigned an output. The L coefficients of the addition signal sequence, which represent the content of the memory cells, are supplied preferably in parallel to linking element 113, which links these coefficient-wise with linking coefficients, for example, by means of scaling, addition, or multiplication. The linking coefficients correspond, for example, to the coefficients of a preamble or are derived based on the coefficients of the preamble by, e.g., the differential modulation or demodulation thereof.

Linking element 113 supplies as a result of the linking L correlation results, which are summed up by addition unit 115, whereby the summation result can be output as a correlation coefficient via output 117.

Figure 2:
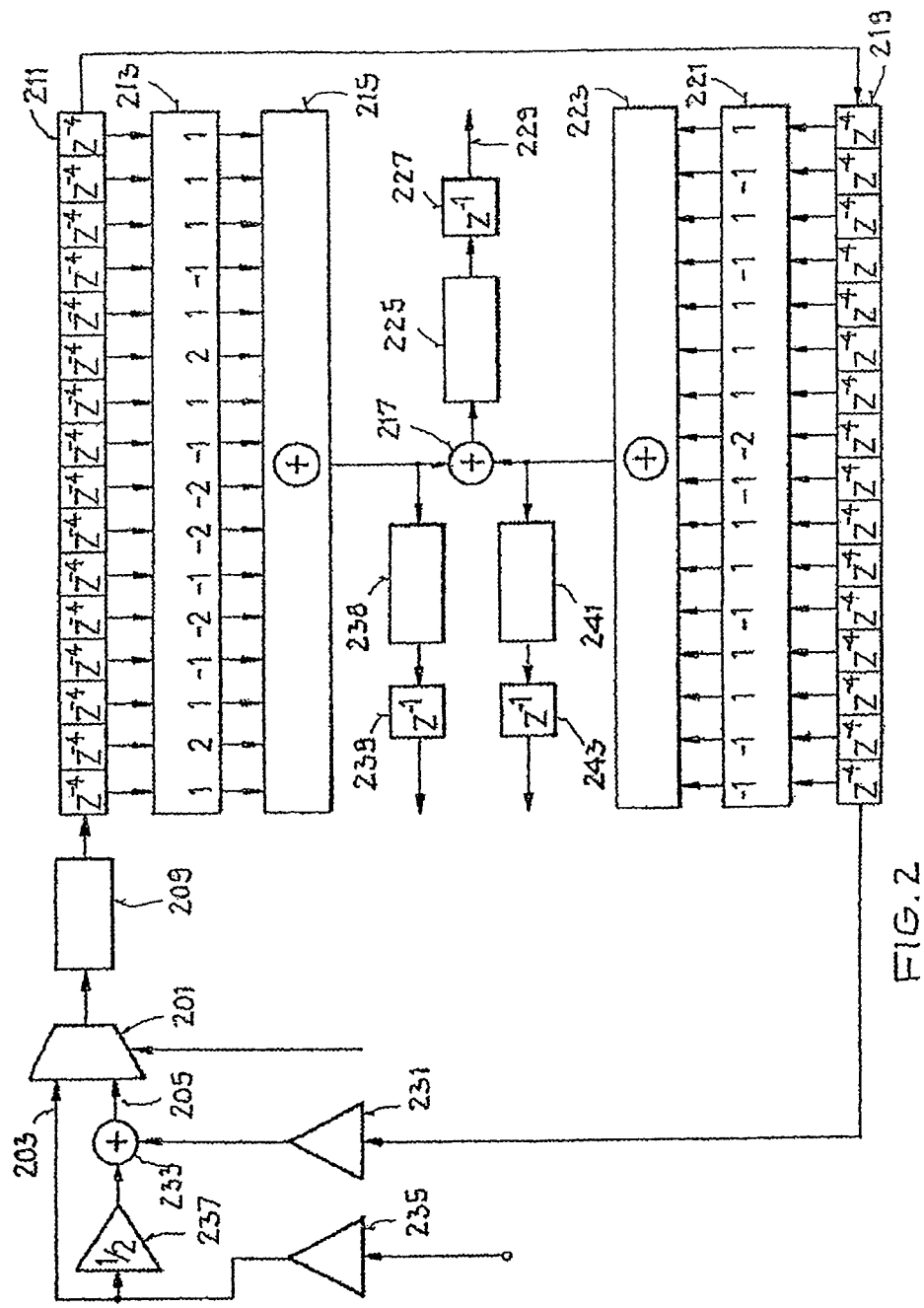
FIG. 2 shows a block diagram of a correlation device according to another embodiment.
Figure 3:
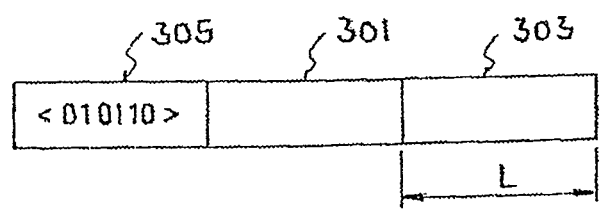
FIG. 3 shows the structure of a receive signal.
Figure 4:
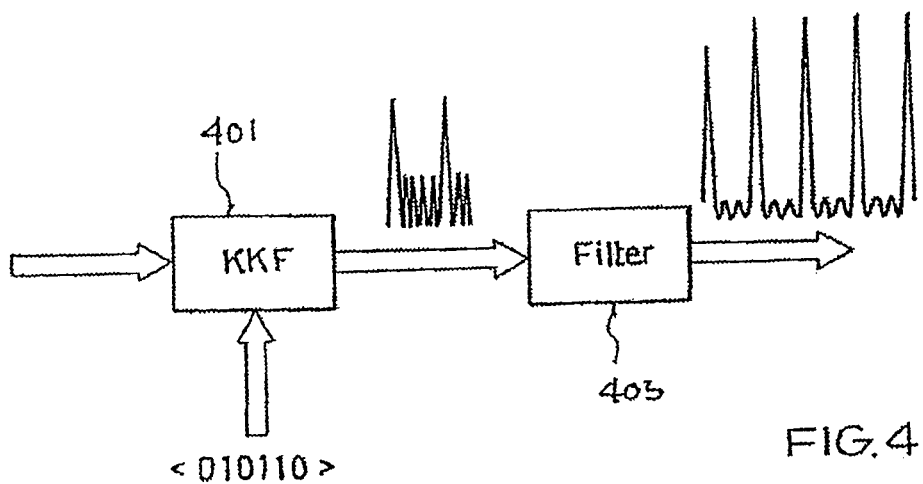
FIG. 4 shows a block diagram of a correlation device.
Figure 5:
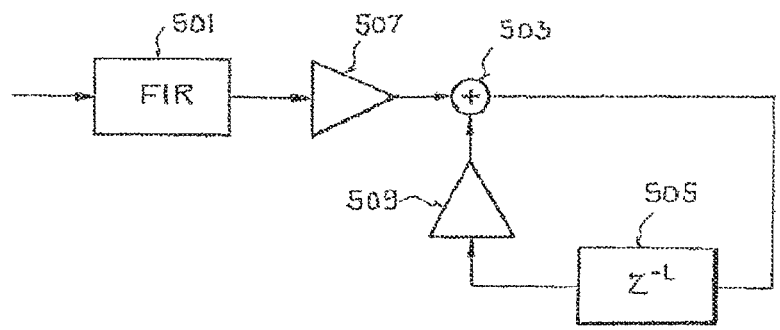
FIG. 5 shows a block diagram of a conventional correlation device.
Figure 6:
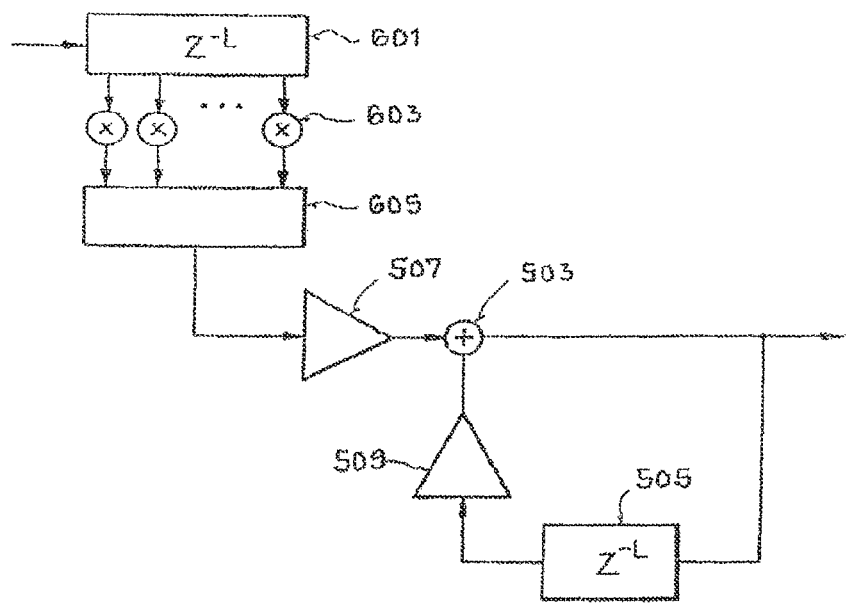
FIG. 6 shows a block diagram of a conventional correlation device.

FIG. 2 shows a block diagram of a correlation device according to another embodiment, by which complex-valued input signal sequences can also be processed.

The correlation device comprises a multiplexer 201 with a first input 203, a second input 205, and an output, which is connected to an input of a first delay element 211 via an optional bit width changing element 209. The first delay element 211 comprises a plurality of outputs, which are coupled to a plurality of inputs of a first linking element 213. The first linking element 213 comprises a plurality of outputs, which are coupled to a first addition unit 215, whereby an output of addition unit 215 is coupled to a first input of an adder 217.

Another output of the first delay element 211 is connected to an input of a second delay element 219, whose plurality of outputs are connected to a corresponding plurality of inputs of a second linking element 221. The second linking element 221 comprises a plurality of outputs, which are coupled to a plurality of inputs of the second addition unit 223, whereby an output of addition unit 223 is coupled to a second input of an adder 217.

Adder 217 comprises further an output, which is coupled via an optional bit width changing element 225 and an optional buffer element 227 to an output 229 of the correlation unit.

Another output of the second delay element 219 is connected via an optional amplifier 231, which has, e.g., an amplification factor of 0.875, to a first input of an adder 233, whose output is connected to the second input 205 of multiplexer 201.

The correlation device comprises further a processing element 235, which is connected to the first input 203 of multiplexer 201 and via an optional amplifier 237, which has, e.g., an amplification factor of ½, to a second input 205 of the adder. Multiplexer 201 can be controlled further via a control input drawn in FIG. 2.

Optionally, the correlation unit comprises a bit width changing element 238 and a buffer element 239, which connected in series are coupled to the output of the first addition unit 215 and output partial correlation results. Further, the correlation unit comprises optionally a bit width changing element 241 and a buffer element 243, which connected in series are coupled to the output of the second addition unit 223 and output additional partial correlation results.

The correlation device shown in FIG. 2 performs a correlation between an input sequence and a link sequence based on two partial correlations. In this case, the first delay unit 211, the first linking element 213, and the first addition unit 215 supply a first auxiliary correlation result in the form of a first auxiliary coefficient and the second delay unit 219, the second linking element 221, and the second addition unit 223 a second auxiliary correlation result in the form of the second auxiliary coefficient. Adder 217 adds the auxiliary coefficients to obtain a correlation coefficient. If the input sequence contains at least one preamble, which is correlated at least partially with the link sequence, the correlation coefficient is not equal to zero and indicates the degree of correlation between the input sequence and the link sequence. In this way, a successive search for the detection of simple boundaries according to a correlation maximum can be performed.

According to another embodiment, the link sequence can be replaced by the following multilevel soft code:
i*[1 2 1 −1 −2 −1 −2 −2 −1 1 2 1 −1 1 1 1 1 −1 1 −1 1 1 1 −2 −1 1 1 −1 1 1 −1 1].

The above multilevel soft code improves the correlation properties particularly for the case of the IEEE 802.15 standard particularly in multipath propagation and leads to a reduction of the intrinsic error.

The generation of link sequences by a differential demodulation of a PN sequence will be explained in detail after the description of the exemplary embodiment of FIG. 2.

According to the invention, the comb filter is integrated and comprises the first and the second delay elements 211 and 219 and adder 233. The comb filter contributes to improving the signal-to-noise ratio by averaging the correlation output over several symbols. The filter has, for example, a first-order IIR transfer function with a feedback delay, which corresponds, for example, to the time delay of a preamble symbol. The, e.g., real-valued comb filter can be described by the following transfer function at a sampling rate of 8 MHz:

$$h(z)=0.5/[1-0.875z^{\wedge}(-128)].$$

The comb filter can be deactivated further, e.g., during the cross-correlation measurement or during the preamble detection. This can be realized, e.g., by feeding the (−i-rotated) receive signal into a register bank and/or by discarding the IIR filter output.

The data path architecture shown in FIG. 2 uses a serial I/Q approach, whereby in an oversampling by, for example, the factor of two, the complex I/Q sampling rate is, e.g., at 4 Msps, which corresponds to 8 Msps in a serial (or multiplexed) I/Q data stream.

The link sequence can be designed, e.g., at the chip level at 2 Msps, whereby the sampling rate of the data path can be at 8 Msps, which results in a delay of four sampling values per tap, which is caused by the memory cells of delay elements 211 and 219.

The mode of operation of the correlation device from FIG. 2 will be described hereafter.

The input sequence is supplied to processing element 235, which performs an operation that can be described mathematically by a multiplication with a complex number −i. An input signal sequence that can be applied at an input of processing element 235 is therefore multiplied by the number −i and supplied both to amplifier 237, whose amplification factor is, for example, ½, and to the first input 203 of multiplexer 201. The output signal of amplifier 237 is supplied to a first input of adder 233. Adder 233 adds the output signal of the second delay element 219 (auxiliary signal sequence), which can be amplified optionally by means of amplifier 231, and the output signal of amplifier 237 and outputs an output signal (addition signal sequence), which is applied at the second input 205 of multiplexer 201.

Multiplexer 201 multiplexes, e.g., coefficient-wise the coefficients of the output signal sequence of processing element 235 and the coefficients of the output signal sequence of adder 233 and supplies the resulting multiplex signal sequence after an optional bit width changing by bit width changing element 209 to first delay element 211.

The first delay element 211 comprises a plurality of memory cells for taking up the output signal sequence coefficients from multiplexer 201. In this case, due to the serial I/Q approach and the oversampling, each memory cell causes a delay at an oversampling by, e.g., the factor of two by 4 clocks (based on the sampling rate of the output signal sequence of multiplexer 201 or on the clock rate of delay element 211).

The output signal sequence coefficients of multiplexer 201 thereby form the content of the memory cells of delay element 211. Each memory cell is provided with an output here, which is connected to a corresponding input of the first link element 213.

The linking element 213 is linked, e.g., by scaling, inversion, addition, or multiplication of the content of the memory cells of delay element 211. In other words, each coefficient of the output signal sequence of multiplexer 201, stored in delay element 211 at a point in time, is linked coefficient-wise with a first link sequence. The first link sequence comprises linking coefficients which correspond, for example, to the first half of the coefficients of the employed PN sequence or are derived therefrom. For example, the first link sequence comprises the coefficients shown in FIG. 2 (1 2 1 −1 −2 −1, etc.).

An output of the first delay element 211 is connected to an input of the second delay element 219, which is preferably made the same as the first delay element 211. The second delay element 219 preferably comprises the same number of memory cells as the first delay element 211 and is provided for the second partial correlation. The outputs of the register cells of the second delay element 219, each of which also causes, e.g., a delay by four clocks, are connected to the corresponding inputs of the second linking element, which performs a coefficient-wise linking of the register content of the second delay element 219 with a second link sequence, to obtain the second auxiliary correlation result. The second link sequence comprises coefficients, which are correlated, for example, with the second half of the coefficients of the employed PN sequence. The second link sequence can thereby be identical to the second half of the PN sequence or, as shown in FIG. 2, differ from it.

The second addition unit 223 is preferably made the same as the first addition unit 215 and by summing up the second correlation results, which are provided at the outputs of the second linking element 223, supplies the second auxiliary correlation result.

Adder 217 adds up the first and the second auxiliary correlation result to obtain a correlation coefficient, which is based on the degree of correlation between the link sequence, which comprises the first and the second link sequence, and the instantaneous signal sequence stored in the memory cells of delay elements 211 and 219. Here, the highest successively determined correlation coefficient corresponds to the (complete) overlapping between the link sequence and the PN sequence in the signal sequence.

The correlation coefficient is provided at the output of adder 217 and after an optional bit width change by bit width changing element 225 is supplied to the optional delay element 227, which causes a delay by, e.g., one clock.

The first auxiliary correlation result at the output of the first addition unit 215 is passed optionally across bit width element 238, which causes a bit width change, and across delay element 239, which causes a delay by, e.g., one clock, and provided for the purpose of optional additional signal processing. In analogy to this, the second auxiliary correlation result at the output of the second addition unit 223 is passed across bit width element 241, which causes a bit width change, and across delay element 243, which causes a delay by, e.g., one clock, and provided for the purpose of optional additional signal processing.

Bit width changing elements 209, 225, 238, and 243, as already mentioned, are optional and cause a bit width change by bit truncation in the manner shown in FIG. 2. In this case, bit width changing element 209 in a sequence comprising 7 bits with the bit indexing [6:0] according to the instruction [6:0]->[5:3] truncates the bits with the indexes 6, 2, and 1 and lets through the bits with the indexes 5 to 3. Bit width changing element 225, for example, in a sequence with 9 bits according to the instruction [8:0]->[7:0] truncates the bit with the index 8 and lets through bits 7 through 0. Bit width changing element 238, for example, in a sequence with 8 bits according to the instruction: [7:0]->[6:0] truncates the bit with the index 7 and lets through the bits 6 through 0.

At the output of the second delay element 219, the auxiliary sequence is provided, which after optional amplification by amplifier 231, whose amplification factor is, for example, 0.875, is supplied to adder 23, as a result of which the feedback loop necessary for the (integrated) IIR filtering results. Therefore, the same delay element comprising the first and the second delay elements 211 and 219 is used both for the correlation and for the comb filtering.

The generation according to the invention of link sequences derived from a PN sequence by differential demodulation, to which reference is made by the term "derived sequence," will be described in detail hereafter:

This is advantageous particularly when—as in applications in industrial monitoring and control, sensor networks, and automation, or in the field of computer peripherals—an extremely low power requirement and a very simple realization are indispensable. Although the invention is not limited to the IEEE standard 802.15.4, this is the case for this standard by way of example in transmitting/receiving devices.

In another embodiment, the derived chips (i.e., the chips of the derived sequence, which can be used as a link sequence) with a first positive index (i.e., all chips other than the first one) each have a value that can be derived from an XOR operation of the PN chip (i.e., the chip of the first PN sequence to which the derived sequence is assigned) with this first positive index with the PN chip preceding index-wise (and thereby in time). Preferably, the first chip (with index zero) derived indexwise (and in time) has a value that can be derived from an XOR operation of the indexwise first PN chip (with index zero) with the indexwise last PN chip. Linking element 113 or 213 and 221 in particular can be realized very simply and with saving of power by using derived sequences of this type.

The following table shows both PN sequences P0, P1, . . . to be used transmit-side according to IEEE 802.15.4 and the derived sequence F0, F1, . . . assigned to PN sequences according to the invention.

In regard to the PN sequences P0, P1, P2, . . . to be used transmit-side, it must be determined first that a sequence set with a total of 16 PN sequences P0, P1, . . . , P15 can be specified. Each PN sequence in this case comprises 32 so-called chips, each of which can assume a value of logic zero (0) or one (1). As is evident from the table, e.g., the first 10 chips of the PN sequence P5 assume the values 0 0 1 1 0 1 0 1 0 0.

For the chips, e.g., of the PN sequence P5, the parameters P5c0 (first chip (c0) of P5), P5c1 (second chip (c1)), P5c30, P5c31 (last chip (c31) are introduced to simplify the description. This also applies to the other PN sequences, so that Picj designates the chip with index j (i.e., the (j+1)-th chip) of the PN sequence with index i (Pi), whereby i=0, 1, . . . , 15 and j=0, 1, . . . , 31. Furthermore, to better differentiate the chips of the PN sequences from those of the derived sequences, the former are designated as PN chips.

If all 16 PN sequences P0, P1, . . . , P15 of the sequence set are divided into a first group PG1 of the eight "first" PN sequences P0, P1, . . . , P7 and a second group PG2 of the eight "second" PN sequences P8, P9, . . . , P15, it is evident further from the table that the first PN sequences P0, P1, . . . , P7 differ from each other only in a cyclic shift of their chip values. Thus, e.g., the bit pattern {1 1 0 1 1 0}, occurring at the start of the PN sequence P0, is evident—in a cyclic expansion—in the PN sequence P1 starting at the PN chip P1c4, in the PN sequence P2 starting at P2c8, in P3 starting at P3c12, in P4 starting at P4c16, . . . , and finally in P7 starting at P7c28. The second PN sequences P8, P9, . . . , P15 as well differ from one another only by a cyclic shift of the chip values.

Pi: PN-sequence i (transmit-side) (Pic0 Pic1 Pic2 Pic3 . . . Pic30 Pic31)

Fi: sequence derived from Pi (Fic0 Fic1 Fic2 Fic3 . . . Fic30 Fic31)

P0:
1 1 0 1 1 0 0 1 1 1 0 0 0 0 1 1 0 1 0 1 0 0 1 0 0 0 1 0 1 1 1 0

F0:
+ + + − − − − − − + + + − + + + + − + − + + − − + + − + + − −

P1:
1 1 1 0 1 1 0 1 1 0 0 1 1 1 0 0 0 0 1 1 0 1 0 1 0 0 1 0 0 0 1 0

F1:
+ + − − + + − − − − − − + + + − + + + + − + − + + − − + + − + −

P2:
0 0 1 0 1 1 1 0 1 1 0 1 1 0 0 1 1 1 0 0 0 0 1 1 0 1 0 1 0 0 1 0

F2:
− + + − + + + − − + + − + + − − − − − + + + − + − + + − − + + −

P3:
0 0 1 0 0 0 1 0 1 1 1 0 1 1 0 1 1 0 0 1 1 1 0 0 0 0 1 1 0 1 0 1

F3:
+ + + − − + + − + + − − + + − − − − − + + + − + − + + − − + − +

P4:
0 1 0 1 0 0 1 0 0 0 1 0 1 1 1 0 1 1 0 1 1 0 0 1 1 1 0 0 0 0 1 1

```
F4:
 +  -  +  -  +  +  +  -  -  +  +  -  +  +  -  -  +  +  +  -  -  -  -  -  -  -  +  +  +  -  +  ++
P5:
 0  0  1  1  0  1  0  1  0  0  1  0  0  0  1  0  1  1  1  0  1  1  0  1  1  0  0  1  1  1  0  0
F5:
 -  +  +  +  +  -  +  -  +  +  -  -  +  +  -  +  +  -  -  +  +  +  -  -  -  -  -  -  -  -  +  ++
P6:
 1  1  0  0  0  0  1  1  0  1  0  1  0  0  1  0  0  0  1  0  1  1  1  0  1  1  0  1  1  0  0  1
F6:
 -  +  +  +  -  +  +  +  -  +  -  +  +  +  -  +  -  -  +  -  +  +  +  -  -  +  -  -  -  -  -  --
P7:
 1  0  0  1  1  1  0  0  0  0  1  1  0  1  0  1  0  0  1  0  0  0  1  0  1  1  1  0  1  1  0  1
F7:
 -  -  -  -  +  +  +  -  +  +  +  -  +  -  +  +  +  -  -  +  -  +  +  +  -  -  -  +  +  +  +  -
P8:
 1  0  0  0  1  1  0  0  1  0  0  1  0  1  1  0  0  0  0  0  1  1  1  0  1  1  1  1  0  1  1
F8:
 -  -  +  +  +  +  +  -  -  -  -  +  -  -  -  -  +  -  +  -  -  +  +  -  -  +  -  -  -  +  ++
P9:
 1  0  1  1  1  0  0  0  1  1  0  0  1  0  0  1  0  1  1  0  0  0  0  0  0  1  1  1  0  1  1  1
F9:
 -  -  +  +  -  -  -  +  +  +  +  +  -  -  +  -  -  -  -  +  -  -  -  +  +  -  -  +
P10:
 0  1  1  1  1  0  1  1  1  0  0  0  1  1  0  0  1  0  0  1  0  1  1  0  0  0  0  0  0  0  1  11
F10:
 +  -  -  +  -  +  +  -  -  -  +  +  +  +  +  -  -  -  +  -  -  -  -  -  +  -  +  -  -  - +
P11:
 0  1  1  1  0  1  1  1  1  0  1  1  1  0  0  0  1  1  0  0  1  0  0  1  0  1  1  0  0  0  0  0  0
F11:
 -  -  -  +  +  -  +  -  -  +  +  -  -  -  -  +  +  +  +  -  -  -  -  +  -  -  +  -  -  +  - +
P12:
 0  0  0  0  0  1  1  1  0  1  1  1  1  0  1  1  1  0  0  0  1  1  0  0  1  0  0  1  0  1  1  0
F12:
 -  +  -  -  -  +  +  -  +  +  -  -  +  -  +  +  +  +  +  -  -  -  -  +  -  -
P13:
 0  1  1  0  0  0  0  0  0  1  1  1  0  1  1  1  1  0  1  1  1  0  0  0  1  1  0  0  1  0  0  1
F13:
 +  -  -  -  -  +  -  +  -  -  -  +  -  -  +  +  -  -  +  +  +  +  +  -  -  - -
P14:
 1  0  0  1  0  1  1  0  0  0  0  0  0  1  1  1  0  1  1  1  1  0  1  1  1  0  0  0  0  1  1  0  0
F14:
 +  -  -  -  +  -  -  +  -  -  +  -  -  +  +  -  -  -  +  -  -  -  +  +  +  +  ++
P15:
 1  1  0  0  1  0  0  1  0  1  1  0  0  0  0  0  0  1  1  1  0  1  1  1  1  0  1  1  1  0  0  0
F15:
 +  +  +  +  +  -  -  -  +  -  -  -  +  -  +  -  -  -  +  +  -  -  +  -  -  +  -  -  - +
```

It is evident furthermore that for each first PN sequence of the first group PG1 there is a second PN sequence of the second group PG2, which differs from this first PN sequence of the first group PG1 only in every second chip value—namely, in an inversion of every second chip value.

If, e.g., the PN sequences P0 from PG1 and P8 from PG2 in the table are compared, it is found that the even-indexed PN chips have identical values (P0c0=P8c0=1; P0c2=P8c2=0; P0c4=P8c4=1; etc.), whereas the odd-indexed PN chips assume different values (inverted to one another) (P0c1=1, P8c1=0, P0c3=1, P8c3=0; P0c5=0, P8c5=1, etc.).

Each PN sequence according to the invention can be assigned a nonidentical derived sequence, matched to the differential demodulation, for example, the derived sequence F0, listed in the table below P0, to the PN sequence P0, the derived sequence F1 to the PN sequence P1, etc. The chips of the derived sequences, here designated as derived chips, can assume the antipodal values +1 and −1, whereby for reasons of clarity only the sign of these values is entered in the table. In analogy to the designation for the PN chips introduced above, the derived chip with the index j of the derived sequence with the index i is designated below with Ficj, whereby i=0, 1, . . . , 15 and j=0, 1, . . . , 31.

The values of the derived chips result as follows from the values of the PN chips. In order to form, e.g., the value of the derived chip F0c2, which according to the table is +1, the value of the PN chip P0c2=0, entered directly above in the table, is to be logically XORed with the value of the PN chip P0c1=1, entered to the left (i.e., preceding in time) of P0c2. The logical XOR operation in this case produces a value of logic 1, which is assigned to the antipodal value +1 entered in the table for F0c2. Accordingly, the value of F0c4 from P0c4 XOR P0c3=1 XOR 1=0 results for the value of −1 entered in the table for F0c4, because logic zero is assigned an antipodal value of −1. This derivation rule applies to all derived chips with a positive even index. If, therefore, Ficj designates the derived Chip with index j of the derived sequence with index i and Picj and Picn the PN chip with index j or n the PN sequence with index i, for positive even indexes j the derived chip Ficj for i=0, 1, . . . , 15 is given as:

$$Ficj = 2*(Picj \ XOR \ Picn) - 1 \ \text{with} \ n = j-1 \ \text{for} \ j = 2, 4, 6, \ldots, 30, \quad (1)$$

whereby the multiplication of the result of the XOR operation by the factor 2 and the subsequent subtraction of 1 is to reflect the assignment of the logic values of 0 and 1 to the antipodal values −1 or +1.

To form the derived chip Ficj with index j=0, the last PN chip Picn with n=31 is to be used instead of the (nonexistent) PN chip Picn, preceding in time, with index n=j−1=−1, i.e., $$Ficj=2*(Picj\ XOR\ Picn)-1 \text{ with } j=0 \text{ and } n=31 \text{ for } i=0,1,\ldots,15. \quad (2)$$

A derivation rule similar to equation (1) applies to the derived chips Ficj with the odd index j. In this case, the result of the XOR operation is to be inverted before the assignment to antipodal values:

$$Ficj=2*INV\{Picj\ XOR\ Picn\}-1 \text{ with } n=j-1 \text{ for } j=1,3,5,\ldots,31, \quad (3)$$

Here, INV{ } designates the logical inversion and i=0, 1, . . . , 15 again applies.

Instead of the inversion of the logic values with the subsequent assignment of logic 0 to the antipodal value −1 and of logic 1 to the antipodal value +1, naturally also a different assignment can be used, namely, of logic 0 to the antipodal value +1 and of logic 1 to the antipodal value −1, and therefore the logical inversion can be omitted. The following then results as the formula $$Ficj=1-2*(Picj\ XOR\ Picn) \text{ with } n=j-1 \text{ for } j=1,3,5,\ldots,31. \quad (3')$$

The use of the PN chip "current" in each case (with the index of the derived chip to be formed) and of the PN chip preceding in each case corresponds to the transmit-side division, described in the introduction to the description, of the even-(odd-) indexed PN chips on the in-phase-(I) carrier (quadrature-phase (Q) carrier) within the scope of the offset QPSK modulation (quaternary phase shift keying). Other transmit-side I/O divisions of the PN chips require an appropriately matched formation of the derived chips.

If all 16 derived sequences F0, F1, . . . , F15 are divided into a third group FG1 of the eight derived sequences F0, F1, F7 and a fourth group FG2 of the eight derived sequences F8, F9, . . . , F15, it is therefore evident from the table that the derived sequences F0, F1, F7 of the third group FG1 differ from one another only in a cyclic shift of their chip values. Thus, e.g., the bit pattern {+ + + − − −}, occurring at the start of the derived sequence F0, is evident—in a cyclic expansion—in the derived sequence F1 starting at the derived chip F1c4, in the derived sequence F2 starting at F2c8, in F3 starting at F3c12, in F4 starting at F4c16, . . . , and finally in F7 starting at F7c28. The derived sequences F8, F9, . . . , F15 of the fourth group FG2 also differ from one another only in a cyclic shift of their chip values.

It is to be established furthermore that for each derived sequence of the third group FG1 there is a derived sequence of the fourth group FG2, which differs only by an inversion of all of its chip values. If, e.g., the derived sequence F0 from FG1 is compared with F8 from FG2 in the table, it is found that all chip values are inverted. Because this also applies to the sequence pairs F1/F9, F2/F10, etc., it is ascertained that all derived sequences of the third group FG1 are contained in inverted form in the fourth group FG2:

$$Ficj=(-1)*Fncj \text{ with } i=0,1,\ldots,7,\ n=i+8 \text{ and } j=0,1,\ldots,31. \quad (4)$$

In contrast to the PN sequences, in which the corresponding sequence pairs P0/P8, P1/P9, etc., differ by an inversion of each second PN chip, the corresponding pairs F0/F8, F1/F9, etc., from the derived sequences differ by an inversion of all of their chip values.

The properties of the link sequences, as listed in the preceding paragraphs, enable extremely simple realizations of linking elements 113, 213, and 221 and contribute to the further reduction of power consumption.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device comprising:
   a correlator comprising:
      a first filter operable to produce at least one correlation result by at least correlating an input signal sequence with a link sequence, the first filter comprising a delay element; and
      a second filter sharing the delay element of the first filter; and
   a detector operable to detect a preamble in the input signal sequence based at least in part on an output signal of the correlator.

2. The device of claim 1, wherein:
   the first filter is a cross-correlation filter; and
   the second filter is a comb filter.

3. The device of claim 1, wherein the first filter further comprises a linking element.

4. The device of claim 1, wherein the link sequence is derived by differential demodulation of the preamble used for the input signal sequence.

5. The device of claim 1, wherein the input signal sequence is a complex-valued signal.

6. The device of claim 1, wherein correlating the input signal sequence with the link sequence comprises performing two partial correlations.

7. The device of claim 1, wherein:
   the delay element is a first delay element; and
   the first filter further comprises a second delay element, the second filter sharing the second delay element of the first filter.

8. A method comprising:
   filtering an input signal sequence using a first filter and a second filter, the first filter comprising a delay element, the second filter sharing the delay element of the first filter;
   producing at least one correlation result by at least correlating the input signal sequence with a link sequence; and
   detecting a preamble in the input signal based at least in part on the at least one correlation result.

9. The method of claim 8, wherein:
   the first filter is a cross-correlation filter; and
   the second filter is a comb filter.

10. The method of claim 8, wherein the link sequence is derived by differential demodulation of the preamble used for the input signal sequence.

11. The method of claim 8, wherein the input signal sequence is a complex-valued signal.

12. The method of claim 8, wherein correlating the input signal sequence with the link sequence comprises performing two partial correlations.

13. The method of claim 8, wherein:
   the delay element is a first delay element; and
   the first filter further comprises a second delay element, the second filter sharing the second delay element of the first filter.

* * * * *

UNITED STATES PATENT AND TRADEMARK OFFICE
CERTIFICATE OF CORRECTION

PATENT NO. : 9,015,220 B2
APPLICATION NO. : 13/551144
DATED : April 21, 2015
INVENTOR(S) : Ferchland et al.

Page 1 of 1

It is certified that error appears in the above-identified patent and that said Letters Patent is hereby corrected as shown below:

In the specification

Col. 7, line 46, delete "HR" and insert -- IIR --, therefor.

Col. 10, line 25, delete "(c1)), P5c30," and insert -- (c1)), . . . ., P5c30, --, therefor.

Col. 10, line 46, delete "(Pico" and insert -- (Pic0 --, therefor.

Col. 10, line 55, delete "0 1 0 0 0 0" and insert -- 0 1 0 0 0 1 0 --, therefor.

Col. 12, line 56, delete "Chip" and insert -- chip --, therefor.

Col. 13, line 32, delete "I/O" and insert -- I/Q --, therefor.

Col. 13, line 35, delete "F1, F7" and insert -- F1, . . . ., F7 --, therefor.

Col. 13, line 38, delete "F1, F7" and insert -- F1, . . . ., F7 --, therefor.

Signed and Sealed this
Twenty-ninth Day of December, 2015

Michelle K. Lee
*Director of the United States Patent and Trademark Office*